(12) United States Patent
James

(10) Patent No.: US 8,616,511 B2
(45) Date of Patent: Dec. 31, 2013

(54) APPARATUS AND METHOD FOR MOUNTING A BIMINI TOP

(75) Inventor: Timothy R. James, Manitowoc, WI (US)

(73) Assignee: Dowco, Inc., Manitowoc, WI (US)

( * ) Notice: Subject to any disclaimer, the term of this patent is extended or adjusted under 35 U.S.C. 154(b) by 765 days.

(21) Appl. No.: 12/362,881

(22) Filed: Jan. 30, 2009

(65) Prior Publication Data

US 2009/0189038 A1   Jul. 30, 2009

Related U.S. Application Data

(60) Provisional application No. 61/024,790, filed on Jan. 30, 2008.

(51) Int. Cl.
*A47B 96/00* (2006.01)

(52) U.S. Cl.
USPC ...... 248/221.11; 248/500; 410/116; 114/361; 24/115 K; 24/647; 24/702

(58) Field of Classification Search
USPC ....... 24/115 K, 647, 650, 669, 702, 289, 291, 24/292, 297, 453, 628, 629, 636, 644, 645, 24/646, 652, 293, 643; 403/60, 323, 127, 403/164, 165, 21, 78; 294/82.22, 82.17; 411/103, 104, 511, 528, 529, 172, 186; 410/116, 104, 106; 292/DIG. 38, 303, 292/163, 137; 248/188.8, 205.6, 205.7, 248/289.11, 282.1, 309.3, 316.2, 309.2, 248/362, 363, 346.04, 349.1, 499, 500, 689, 248/221.11, 221.12, 509; 135/88.01, 88.03, 135/88.15, 97, 147, 148, 149, 151, 152; 114/361
See application file for complete search history.

(56) References Cited

U.S. PATENT DOCUMENTS

| 455,101 A | 6/1891 | Heydenreich |
| 691,477 A * | 1/1902 | Murphy .................. 403/78 |

(Continued)

FOREIGN PATENT DOCUMENTS

| DE | 3042498 A1 | 5/1982 |
| DE | 202005009471 U1 | 10/2005 |
| FR | 975118 A | 3/1951 |

OTHER PUBLICATIONS

International Search Report and Written Opinion for corresponding International Application No. PCT/US09/32582 mailed on Aug. 28, 2009.

(Continued)

*Primary Examiner* — Terrell McKinnon
*Assistant Examiner* — Eret McNichols
(74) *Attorney, Agent, or Firm* — Michael Best & Friedrich LLP

(57) ABSTRACT

A quick-release swivel fork assembly for pivotably supporting a remote member. The quick-release swivel fork assembly includes a first portion, a body portion releasably coupled to the first portion, a pin supported by the body portion, and a latch member coupled to the body portion. The body portion is rotatable relative to the first portion about a first axis, while separation along the first axis is prevented. The pin defines a second axis for rotatably mounting the remote member. The latch member is biased to a first position in which the latch member blocks separation of the body portion from the first portion in a direction substantially perpendicular to the first axis. The latch member is operable to selectively enable separation of the body portion from the first portion in a direction substantially perpendicular to the first axis.

22 Claims, 14 Drawing Sheets

(56) References Cited

U.S. PATENT DOCUMENTS

| | | | |
|---|---|---|---|
| 1,151,131 A | | 8/1915 | Starliper |
| 1,256,139 A | | 2/1918 | Kietlinski |
| 1,810,704 A | | 6/1931 | Gentry |
| 2,676,025 A | | 4/1954 | Davis |
| 2,756,791 A | | 7/1956 | Ferrara |
| 2,796,099 A | | 6/1957 | Dierker |
| 2,811,378 A | * | 10/1957 | Kalista ............ 403/72 |
| 2,817,345 A | * | 12/1957 | Woodruff, Sr. ........... 135/161 |
| 3,178,971 A | | 4/1965 | Bachli et al. |
| 3,297,293 A | | 1/1967 | Andrews et al. |
| 3,492,033 A | | 1/1970 | Mueller |
| 3,504,937 A | * | 4/1970 | Vlatko ............ 403/164 |
| 3,552,775 A | | 1/1971 | Warner |
| 3,770,236 A | * | 11/1973 | Marsh et al. ............ 248/408 |
| 4,034,946 A | | 7/1977 | Zimmer, Jr. |
| 4,036,459 A | | 7/1977 | Alexander et al. |
| 4,132,488 A | | 1/1979 | Strong |
| 4,142,703 A | * | 3/1979 | Moretto ............ 248/214 |
| 4,149,820 A | | 4/1979 | Newlin |
| 4,274,181 A | * | 6/1981 | Schaller ............ 24/656 |
| 4,291,822 A | * | 9/1981 | Simonds ............ 224/257 |
| 4,570,987 A | | 2/1986 | Wong et al. |
| 4,630,982 A | * | 12/1986 | Fenner ............ 410/102 |
| 4,669,907 A | * | 6/1987 | Patton ............ 403/78 |
| 4,704,929 A | | 11/1987 | Osada |
| 4,852,840 A | * | 8/1989 | Marks ............ 248/230.4 |
| 4,949,707 A | * | 8/1990 | LeVahn et al. ............ 600/234 |
| 4,955,749 A | * | 9/1990 | Panovic ............ 403/11 |
| 5,056,387 A | | 10/1991 | Cook |
| 5,242,240 A | * | 9/1993 | Gorham ............ 403/391 |
| 5,286,130 A | | 2/1994 | Mueller |
| 5,393,162 A | | 2/1995 | Nissen |
| 5,405,347 A | | 4/1995 | Lee et al. |
| 5,520,075 A | | 5/1996 | Barmore |
| 5,577,415 A | | 11/1996 | Reasoner |
| 5,622,443 A | * | 4/1997 | Lampert et al. ............ 403/294 |
| 5,647,681 A | | 7/1997 | Chen |
| 5,743,576 A | | 4/1998 | Schron, Jr. et al. |
| 5,766,081 A | | 6/1998 | Desmarais |
| 5,775,652 A | * | 7/1998 | Crawshaw et al. ........ 248/230.6 |
| 6,017,071 A | | 1/2000 | Morghen |
| 6,053,122 A | | 4/2000 | Jordan, III |
| 6,370,803 B1 | | 4/2002 | Burquest |
| 6,378,400 B1 | | 4/2002 | Bogli |
| 6,536,726 B1 | * | 3/2003 | Tull ............ 248/188.8 |
| 6,554,524 B1 | | 4/2003 | Smith |
| 6,594,860 B2 | | 7/2003 | Czipri |
| 6,594,870 B1 | * | 7/2003 | Lambrecht et al. ............ 24/297 |
| 6,675,546 B2 | | 1/2004 | Coles |
| 6,776,069 B2 | | 8/2004 | Soreo et al. |
| 6,802,275 B2 | | 10/2004 | Schmidt |
| 6,902,341 B1 | | 6/2005 | Rauschert |
| 6,907,642 B1 | | 6/2005 | Czipri |
| 7,162,968 B2 | * | 1/2007 | Thompson ............ 114/361 |
| 7,210,871 B2 | | 5/2007 | Slatter |
| 7,281,889 B2 | * | 10/2007 | Anderson et al. ............ 410/104 |
| 7,293,763 B2 | | 11/2007 | Lutter et al. |
| 7,302,907 B2 | | 12/2007 | Carlton |
| 7,334,956 B2 | * | 2/2008 | Taylor ............ 403/87 |
| 7,888,572 B2 | * | 2/2011 | Rosenberg et al. ............ 84/327 |
| 7,954,205 B2 | * | 6/2011 | Xueyong et al. ............ 24/289 |
| 2002/0129465 A1 | | 9/2002 | Czipri |
| 2004/0258460 A1 | | 12/2004 | Taylor |
| 2006/0016381 A1 | * | 1/2006 | Schultz ............ 114/361 |
| 2006/0087146 A1 | | 4/2006 | Erskine et al. |
| 2008/0202313 A1 | * | 8/2008 | Ruel ............ 84/327 |
| 2009/0103997 A1 | * | 4/2009 | Csik et al. ............ 411/112 |

OTHER PUBLICATIONS

Quick Release Mast Bases, on-sale in the U.S. By Chinook Sailing Products more than one year prior to Jan. 30, 2008. http://web.archive.org/web/*/http://www.chinooksailing.com/web03/bases.html. See attached Statement of Relevance and Figures A&B.

* cited by examiner

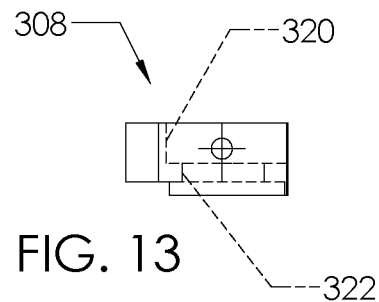
FIG. 13
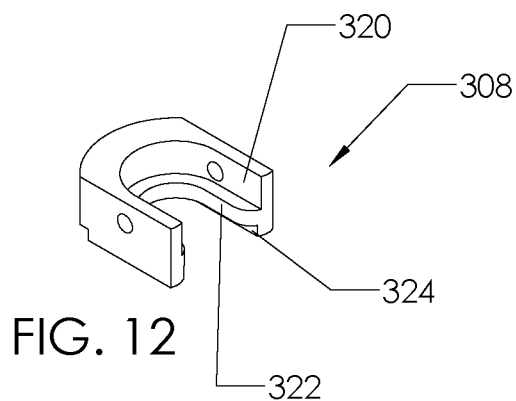
FIG. 12
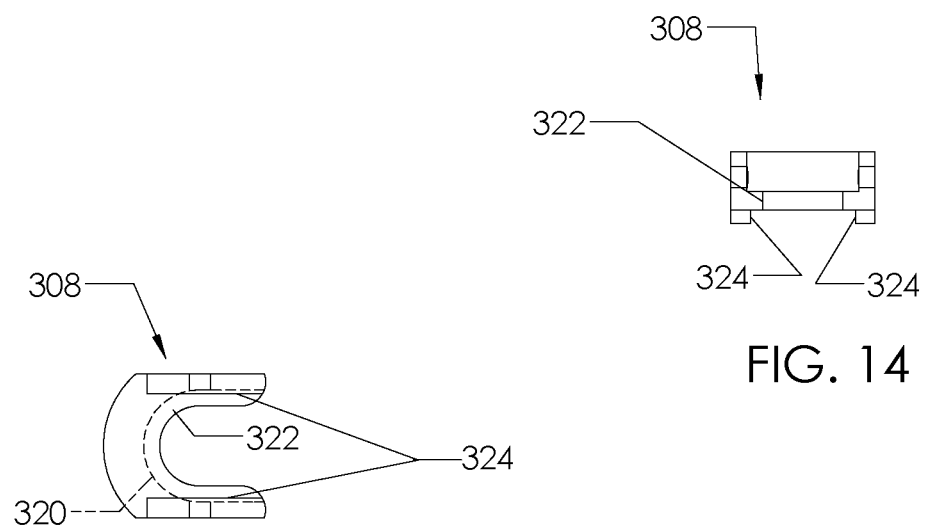
FIG. 14
FIG. 15

APPARATUS AND METHOD FOR MOUNTING A BIMINI TOP

CROSS-REFERENCE TO RELATED APPLICATIONS

This application claims priority to U.S. Provisional Patent Application Ser. No. 61/024,790, filed on Jan. 30, 2008, the entire contents of which are hereby incorporated by reference.

BACKGROUND

Over the last 20 years, the bimini top has become a ubiquitous feature on runabout and pontoon boats. This feature is often the only protection from sun, wind, or rain on many small boats. A bimini top requires that attachment points are secured to the boats exterior. The attachment points allow the bimini top to move to several configurations. These frequently include: a fully down configuration for trailering or storage, an "arch" position that allows the vessel occupants to store the bimini top in a position overhead that is clear of the usable space within the vessel, and a deployed position that affords the vessel occupants protection. The bimini top is typically designed to be used while the vessel is stationary and underway. Rigid support members are required to support the top in the arch position and flexible or stationary supports are used to secure the top in the deployed position. Additional flexible or rigid support members may be employed to support the tubular framework of the top with regard to wind and accelerative loads.

The connections between the framework and the vessel require articulation in at least one plane. This situation is rarely present, however with the compound curvature of the mounting surfaces and angular framework of the bimini top. To accommodate multi-planar articulation, hardware arrangements may include loose fitting pin joints, which allow angular displacement when an eye is secured to a pin with generous clearance between the parts. Such pin joints are prone to rattling during vessel operation. Another possible solution includes the use of ball and socket joints, which allow limited angular displacement, although the frame is free to move in all directions. A third possible solution includes the use of "heim" or rod end bearings. Such products require precise machining and are expensive to implement.

SUMMARY

In one embodiment, the invention provides a quick-release swivel fork assembly for pivotably supporting a remote member. The quick-release swivel fork assembly includes a first portion and a body portion releasably coupled to the first portion. The body portion is rotatable relative to the first portion about a first axis of rotation. A groove and projection interface is provided between the first portion and the body portion, which enables relative rotation between the first portion and the body portion while preventing separation along the first axis of rotation. A pin is supported by the body portion and defines a second axis of rotation for rotatably mounting the remote member to the swivel fork assembly. A latch member is coupled to the body portion. The latch member is biased to a first position in which the latch member blocks separation of the body portion from the first portion in a direction substantially perpendicular to the first axis of rotation. The latch member is operable to selectively enable separation of the body portion from the first portion in a direction substantially perpendicular to the first axis of rotation.

In another embodiment, the invention provides a quick-release swivel fork assembly for pivotably supporting a remote member. The quick-release swivel fork assembly includes a first portion and a body portion releasably coupled to the first portion. The body portion is rotatable relative to the first portion about a first axis of rotation when coupled to the first portion and substantially immovable relative to the first portion along the first axis when coupled to the first portion. The body portion includes a recess opened in a direction substantially perpendicular to the first axis of rotation. A pin is supported by the body portion and defines a second axis of rotation for rotatably mounting the remote member to the swivel fork assembly. A latch member is coupled to the body portion. The latch member is biased to a first position that inhibits removal of the body portion from the first portion in the direction of opening of the recess. The latch member is operable to selectively enable removal of the body portion from the first portion in the direction of opening of the recess.

In yet another embodiment, the invention provides a quick-release swivel fork assembly for pivotably supporting a remote member. The quick-release swivel fork assembly includes a first portion and a body portion releasably coupled to the first portion. The body portion is rotatable relative to the first portion about a first axis of rotation when coupled to the first portion and substantially immovable relative to the first portion along the first axis when coupled to the first portion. The body portion is configured to be coupled with and removed from the first portion with movement substantially perpendicular to the first axis of rotation. A pin is supported by the body portion and defines a second axis of rotation for rotatably mounting the remote member to the swivel fork assembly. A latch member is coupled to the body portion and is movable between a first position that inhibits removal of the body portion from the first portion and a second position that enables removal of the body portion from the first portion. The latch member is movable from the first position to the second position against a bias force that is substantially parallel to the first axis of rotation.

Other aspects of the invention will become apparent by consideration of the detailed description and accompanying drawings.

BRIEF DESCRIPTION OF THE DRAWINGS

FIG. 12 is a perspective view of a wrench insert of the installation tool of FIG. 10.

FIG. 13 is a front view of the wrench insert of FIG. 12.

FIG. 14 is a side view of the wrench insert of FIG. 12.

FIG. 15 is a bottom view of the wrench insert of FIG. 12.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
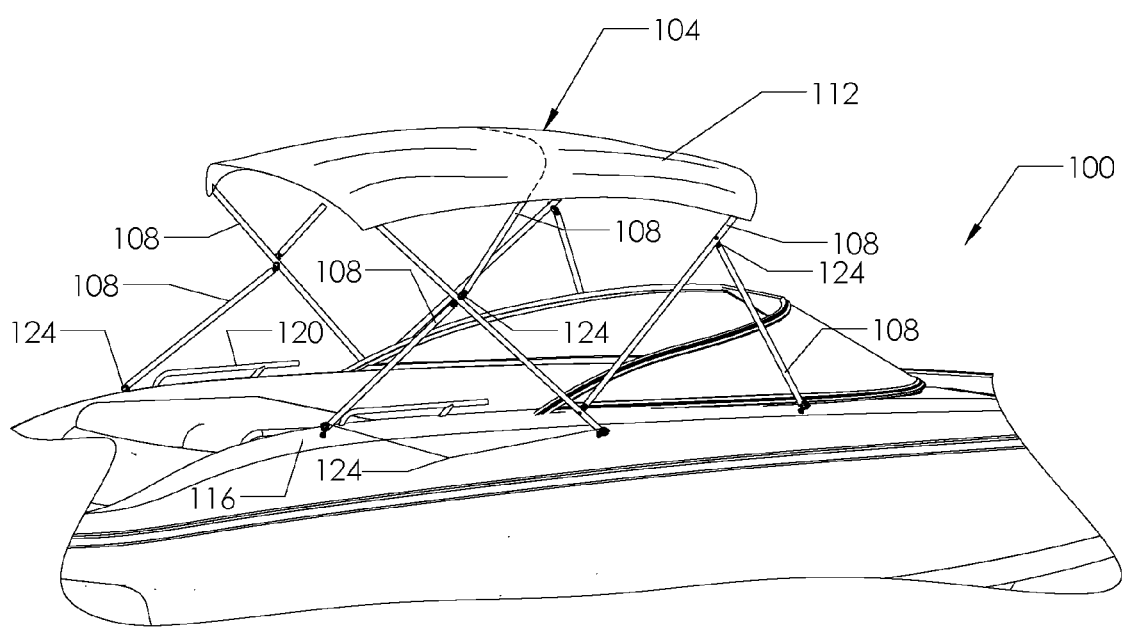
FIG. 1 is a perspective view of a boat having a bimini top.

FIG. 1 illustrates a portion of a vessel such as a recreational boat 100 having a bimini top 104. The bimini top 104 includes a frame assembly having a plurality of frame members 108 and a cover 112 made of fabric, textile, etc. (e.g., canvas). The bimini top 104 is retractable relative to the boat 100 by movement of the frame members 108. At least some of the frame members 108 are coupled to a boat deck 116 at lower ends thereof. The frame members 108 may be coupled directly to the boat deck 116 or to a rail 120 or other structure provided on the boat deck 116. One or more additional frame members 108 are provided at the upper ends of the deck-mounted frame member 108 for supporting the cover 112.

Deck-mounted frame members 108 on opposing sides are typically not parallel (for example, tilting toward each other at the upper ends). Because the deck-mounted frame members 108 are not parallel, joints 124 at the ends of the frame members 108 must provide for multi-angular rotation that takes place when the bimini top 104 is rotated between stowed and deployed positions. Thus, a simple minimal-clearance pin joint cannot be used at the joints 124.

Figure 2:
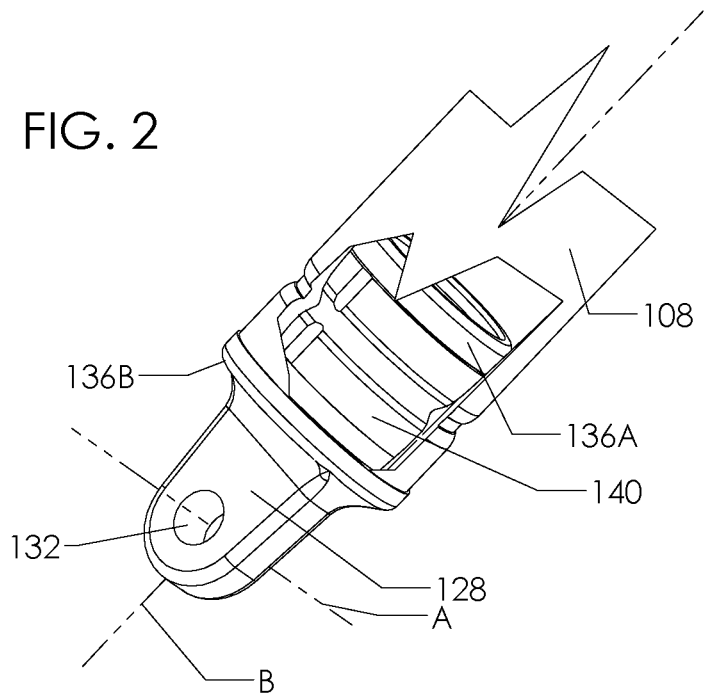
FIG. 2 is a perspective view of an end portion of a frame member of the bimini top, including a rotatable eye end.
Figure 3:
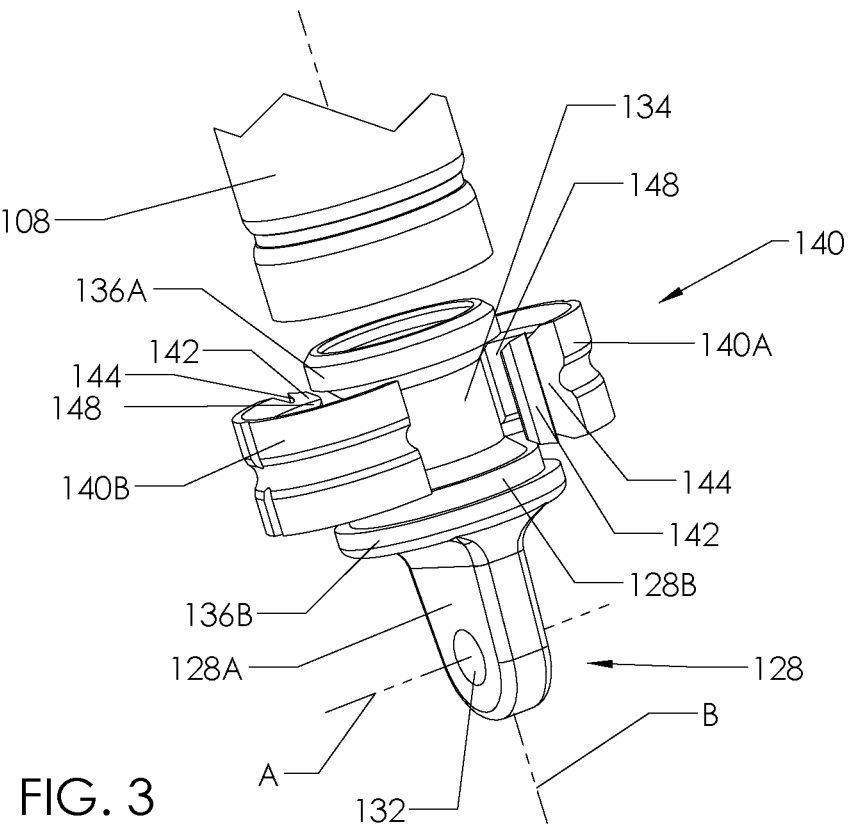
FIG. 3 is an exploded assembly view of the frame member of FIG. 2.

As shown in FIG. 2, the ends of the frame members 108 include rotatable eye ends 128. The rotatable eye ends 128 provide a second axis of rotation B, in addition to an axis of rotation A defined by a hole 132 in the eye end 128, which is configured to receive a pin (not shown in FIG. 2). Thus, at least part of the pin joint defined by the eye ends 128 can swivel or rotate with respect to the corresponding frame member 108, yielding an additional degree of freedom not present in a simple pin joint. The hole 132 may be relatively close-fitting with the pin to provide precise and predictable pivoting rotation without undesirable rattling at the joint(s) 124. The eye end 128 may be incorporated into the end of the frame member 108, as shown in FIGS. 2 and 3.

Figure 4:
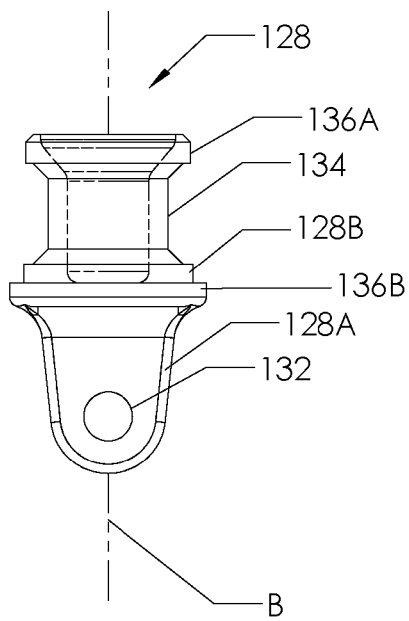
FIG. 4 is a front view of the eye end of FIGS. 2 and 3.
Figure 5:
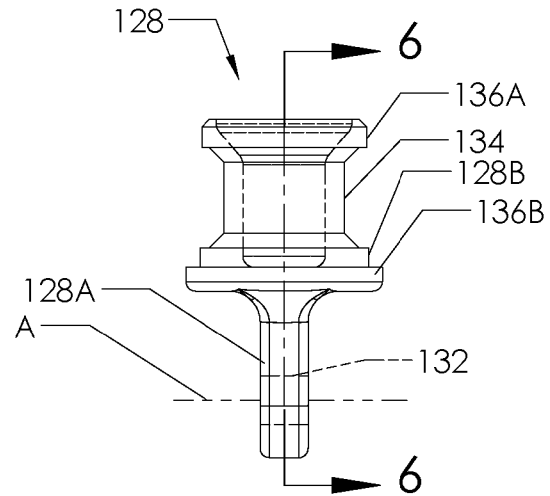
FIG. 5 is a side view of the eye end of FIGS. 2 and 3.
Figure 6:
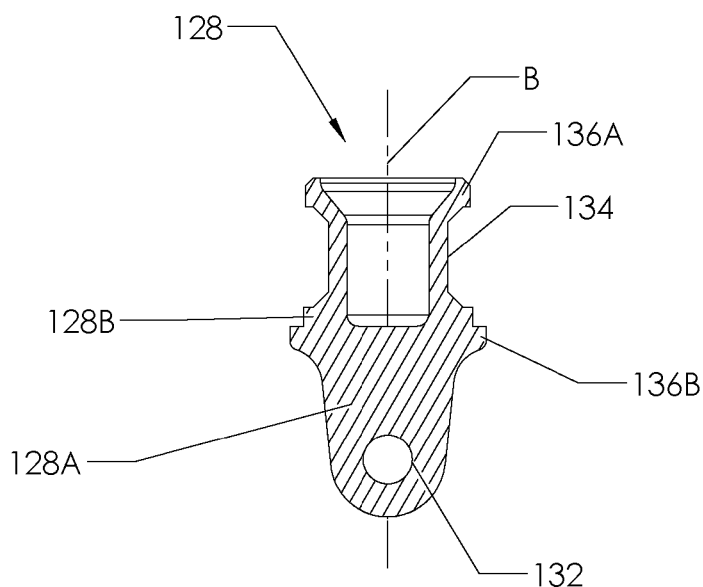
FIG. 6 is a cross-sectional view of the eye end, taken along line 6-6 of FIG. 5.

The eye end 128 includes an exposed portion 128A and an attachment portion 128B. The attachment portion 128B includes an area 134 of reduced diameter compared with a pair of flanges 136A, 136B, which flank the attachment portion 128B. A bushing 140 is fitted inside the end of the frame member 108. In the illustrated construction, the bushing 140 is a two-piece bushing including first and second halves 140A, 140B. The halves 140A, 140B include attachment features, such as barbed hooks 142 and recesses 144 that interlock with each other to interlock the halves 140A, 140B to each other. The halves 140A, 140B combine to define a contiguous and smooth interior surface 148 that faces the area 134 of reduced diameter on the eye end 128. The bushing 140 fits tightly within the frame member 108 (e.g., by press-fit, crimping, etc.), and the eye end 128 is rotatable relative to the bushing 140 and the frame member 108. The frame member 108 with the rotatable eye end 128 may be coupled to the boat deck 116 (or a rail 120 thereon) as described in further detail below to provide at least one additional axis of rotation in addition to the axes A, B defined above. Additional views of the eye end 128 are provided in FIGS. 4-6.

Figure 7:
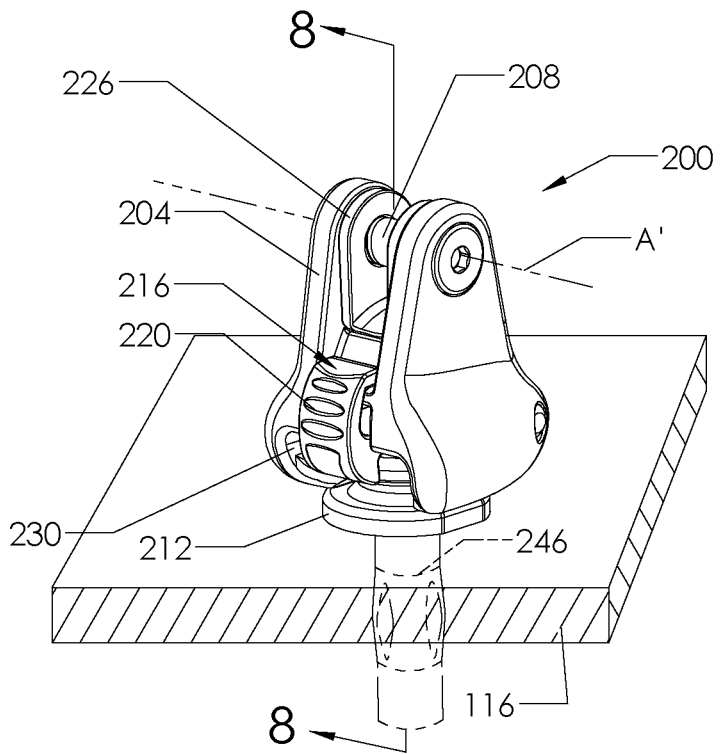
FIG. 7 is a perspective view of a quick-release, two-part swivel fork assembly, mounted to a substrate.

FIG. 7 illustrates a swivel fork assembly 200 that is attachable to a substrate or structure to define a mounting location for a frame member 108 or another remote member. As used herein "remote member" refers to any device, structure, or member that is separate from the swivel fork assembly 200 and attachable thereto. In the illustrated construction, the swivel fork assembly 200 is attachable to the boat deck 116 as described below. The swivel fork assembly 200 includes a body 204 that is rotatably mounted to the deck 116. The body 204 is constructed of stainless steel in some constructions and of die cast zinc or aluminum in other constructions. The swivel fork assembly 200 further includes a pin 208 supported by the body 204 for receiving a hole formed in a remote member. For example, the pin 208 can be received in the hole 132 formed in the eye end 128 described above to rotatably mount a frame member 108 to the deck 116. Thus, the swivel fork body 204 is rotatable relative to the deck 116 to define a third axis of rotation C (FIG. 8) for the frame member 108, in addition to the axes A and B. When the eye end 128 is mounted to the swivel fork assembly 200, the axis A is coincident with an axis A' defined by the pin 208.

Figure 8:
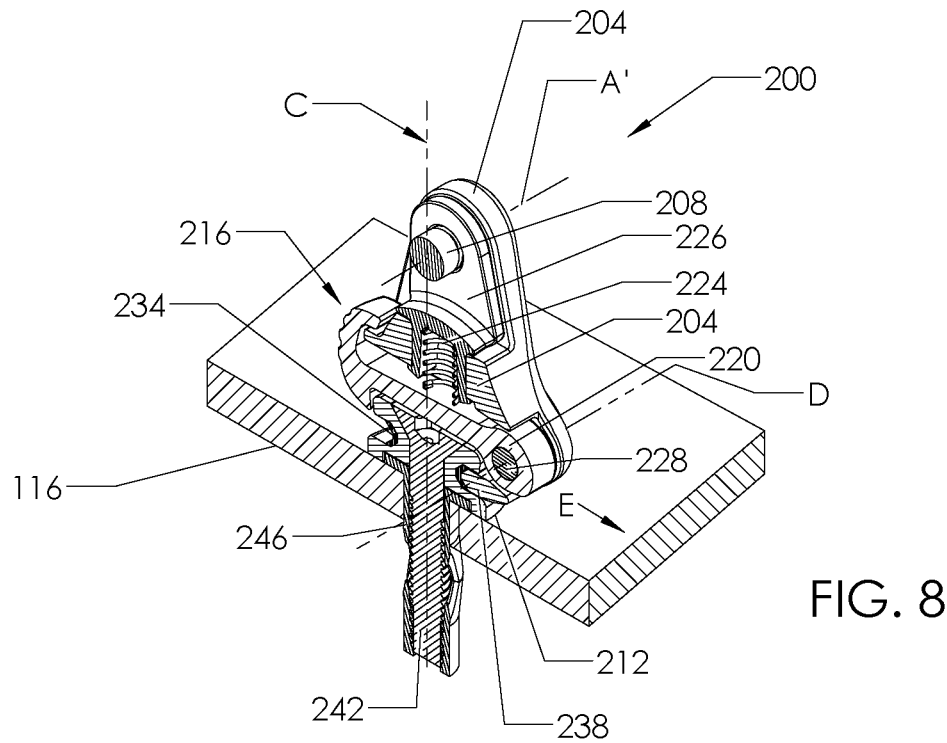
FIG. 8 is a cross-sectional view of the quick-release swivel fork assembly, taken along line 8-8 of FIG. 7.
Figure 9:
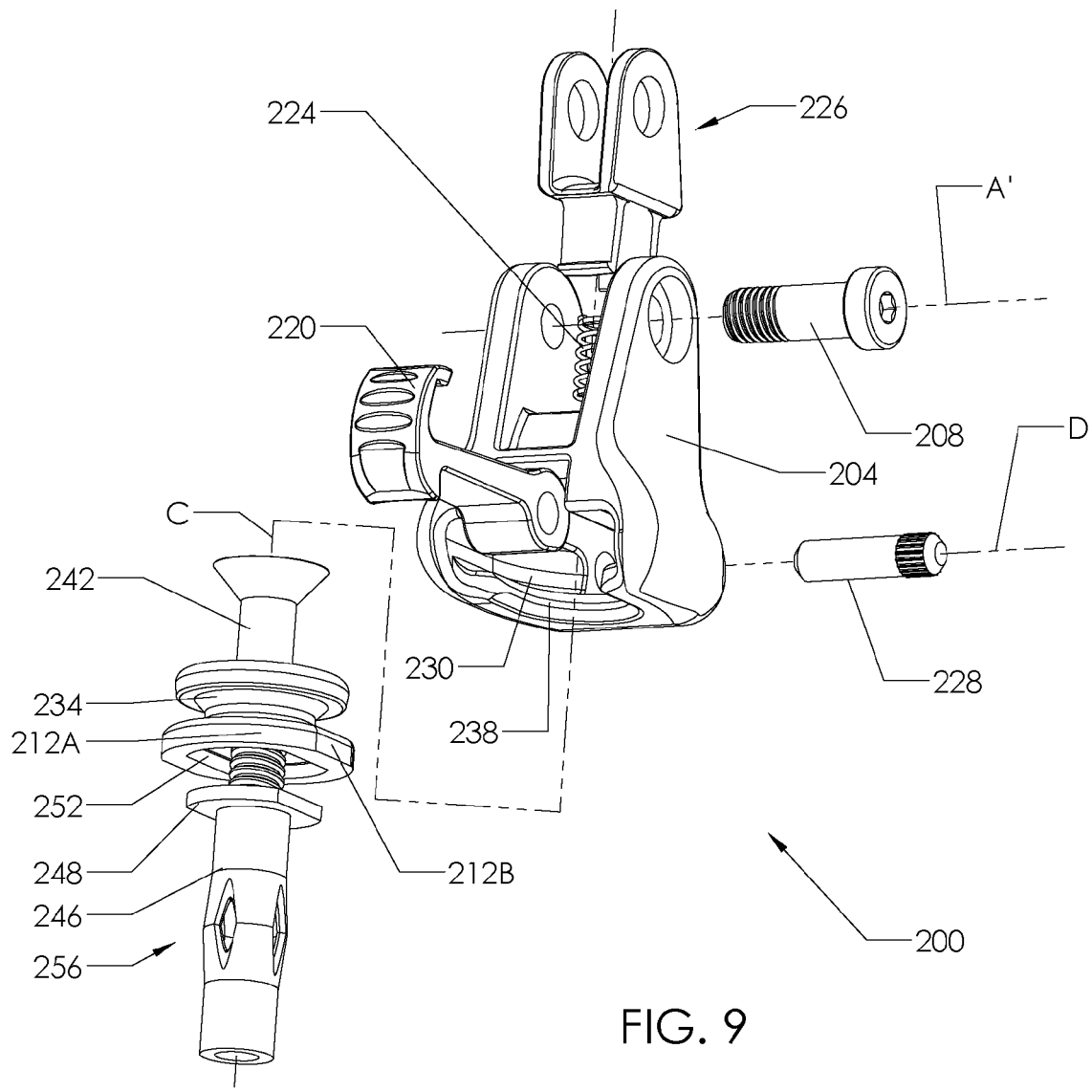
FIG. 9 is an exploded assembly view of the quick-release swivel fork assembly of FIG. 7.

In the illustrated construction, the body 204 of the swivel fork assembly 200 is detachably coupled to a first portion (part or all of which may be fixed-mounted or stationary) of the swivel fork assembly 200. The first portion can include a deck button 212. In the illustrated construction, a latch mechanism 216 serves as a quick-release device, coupling the body 204 and the deck button 212. As used herein, "quick-release" refers to a connection of a type that requires no tools and no manipulation of threaded fasteners to couple or decouple components connected thereby. As illustrated in FIG. 8, the latch mechanism 216 includes a latch member 220 that is biased downwardly (towards the deck button 212 along the third axis C) by a biasing member, such as a coil spring 224. A spring retainer 226 retains the spring 224 and serves as a bushing or liner in the area of the body 204 adjacent the pin 208. FIG. 9 illustrates the entire swivel fork assembly 200 in an exploded assembly view.

The latch member 220 is pivotable about a fourth axis D defined by a pin 228, such that the latch member 220 may be manually pivoted upward (away from the deck button 212) to release the body 204 from the deck button 212. The pin 228 can be pressed into the body 204 with an interference fit. Alternately, and particularly in the case where the body 204 is die cast, the pin 228 may be a semi-tubular rivet. When the latch member 220 is pressed upward to overcome the biasing force of the spring 224, the body 204 is able to slide off of the deck button 212 in a direction perpendicular to the third axis C as indicated by the arrow E in FIG. 8. The deck button 212 is released through an opening or recess 230 formed in the body 204.

When the deck button 212 is fully positioned or seated within the body 204, a circumferentially-extending groove 234 in the deck button 212 receives a projecting rim 238 that extends radially inwardly towards the third axis C, as shown in FIGS. 8 and 9. A bottom flange 212A of the deck button 212 includes one or more flat sides 212B, as discussed below, which do not interfere with the ability of the body 204 to swivel on the deck button 212. In fact, the deck button 212 can include at least a partial overmold having a low friction coefficient to enhance the sliding effect between the deck button 212 and the body 204. The overmold may also take up any clearance between the deck button 212 and the body 204 that might otherwise result in rattling between the parts. Engagement between the rim 238 and the groove 234 prevents the body 204 from being separated from the deck button 212 along the third axis C while enabling plane rotation of the body 204 about the third axis C and relative to the deck button 212. In a further construction, the latch member 220 is configured to move between locked and unlocked positions in other ways, such as by vertical sliding or pivoting about an axis other than axis D.

With further reference to FIGS. 8 and 9, the attachment of the deck button 212 (and the swivel fork assembly 200 as a whole) is described in further detail. A fastener, such as a screw 242, extends along the third axis C and through a central aperture in the deck button 212. The head of the screw 242 is received in a first side of the deck button 212 (upper side as viewed in FIG. 9). A rivet nut 246 is provided on the opposite side of the deck button 212 from the side that receives the head of the screw 242. The rivet nut 246 includes a non-circular flange 248 formed at a first end thereof. The flange 248 fits into a recess 252 of similar shape formed in a second side of the deck button 212 (lower side as viewed in FIG. 9, opposite the first side). The flange 248 and the recess 252 may each include one or more flat sides and one or more curved sides and may or may not be identical in perimeter shape, but the shapes of the flange 248 and the recess 252 are such that the deck button 212 and the rivet nut 246 do not rotate relative to one another.

By way of the recess 252, the rivet nut 246 is able to be held captive by the deck button 212 during installation and also after installation. The rivet nut 246 is similar to a drywall anchor, molly bolt, etc. in that the rivet nut 246 is set (inserted and anchored) into a substrate and the screw 242 is threaded into the rivet nut 246 to mount an object (e.g., the deck button 212). In the illustrated construction, the screw 242 that ultimately mounts the deck button 212 is also used to set the rivet nut 246. The screw 242 engages the end of the rivet nut 246 opposite the flange 248. Rotation of the screw 242 relative to the rivet nut 246 (and the deck button 212) draws the remote end of the rivet nut 246 towards the flange 248, deforming a crumple zone 256 that is predefined in the central portion of a length of the rivet nut 246. By deforming the rivet nut 246 along the back side of a fixed wall or other structure or substrate, the rivet nut 246 anchors itself to that structure to provide a structurally sound mounting location for the screw 242 (and in the illustrated construction, for the deck button 212). It should be noted that the deck button 212 can also be mounted with the screw 242 and a conventional nut (not shown) if the backside of the substrate is accessible.

In contrast to prior art rivet nut installation, the item to be mounted (e.g., the deck button 212) is mounted to the substrate (e.g., the boat deck 116) during the setting of the rivet nut 246 in the substrate. Rather than using a threaded mandrel to set the rivet nut 246, then removing the mandrel, and inserting the screw 242, the screw 242 operates to set the rivet nut 246 during mounting of the deck button 212 to the deck 116. The recess 252 in the deck button 212 helps to make this possible by fixing the rivet nut 246 against rotation with respect to the deck button 212. Further, an installation tool 300 can be provided to hold the deck button 212 and facilitate driving of the screw 242.

Figure 10:
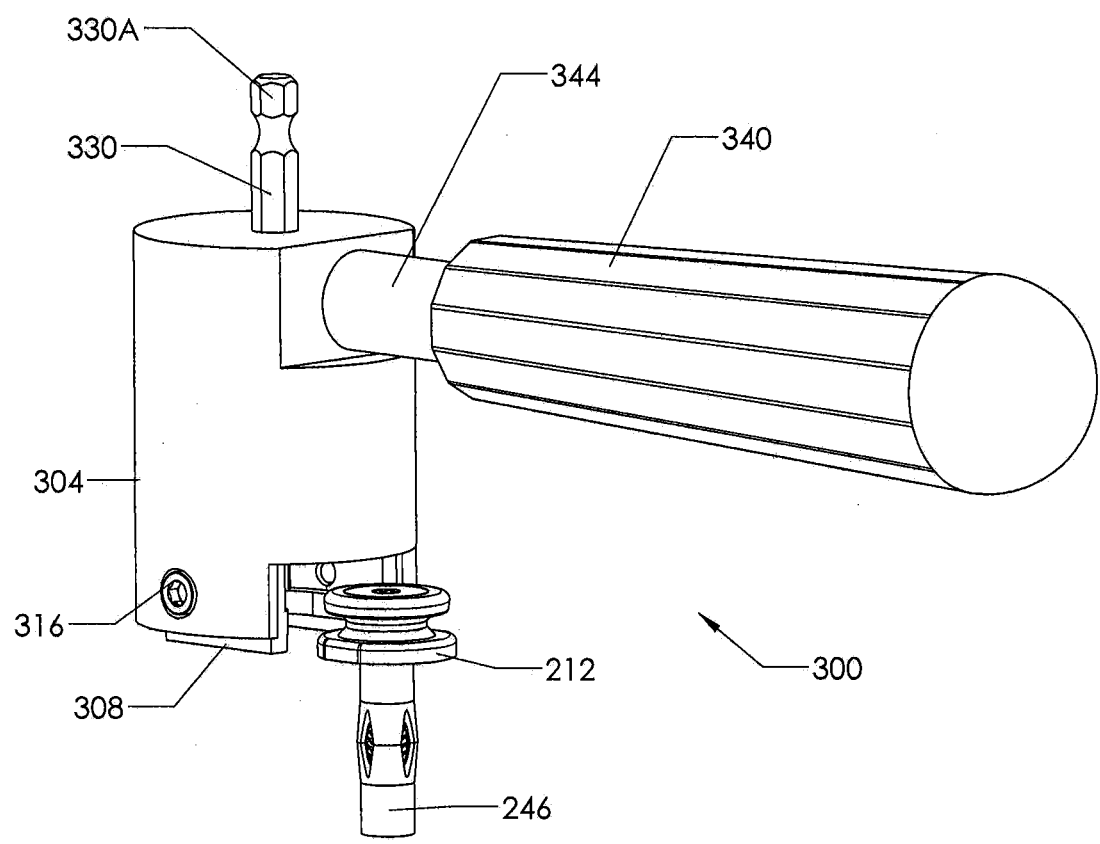
FIG. 10 is a perspective view of an installation tool used for mounting the quick-release swivel fork assembly of FIG. 7 to a substrate.
Figure 11:
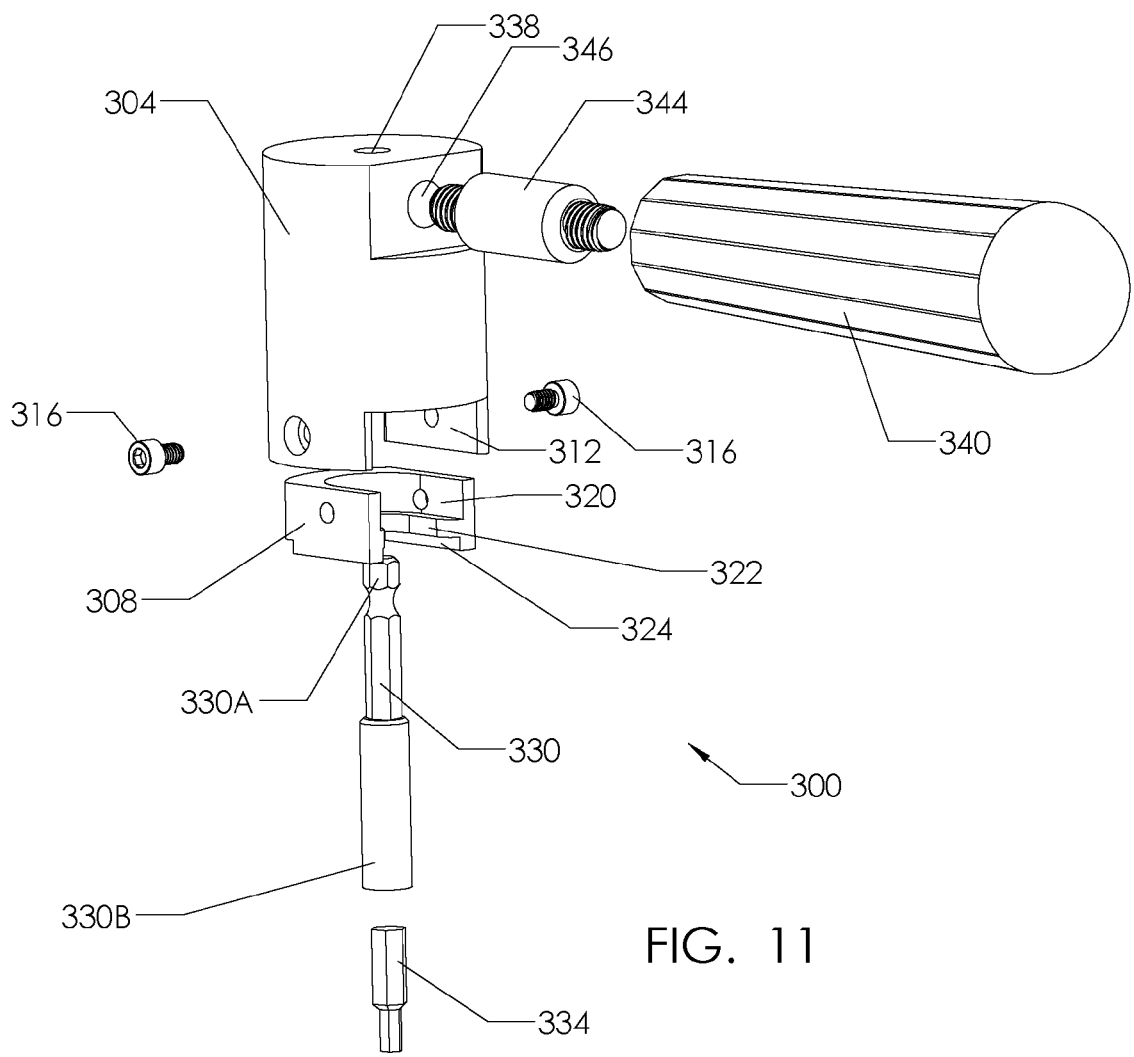
FIG. 11 is an exploded assembly view of the installation tool of FIG. 10.
Figure 17:
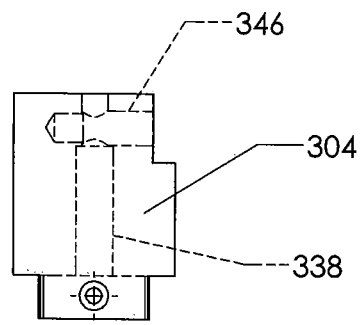
FIG. 17 is a front view of the wrench body of FIG. 16.
Figure 18:
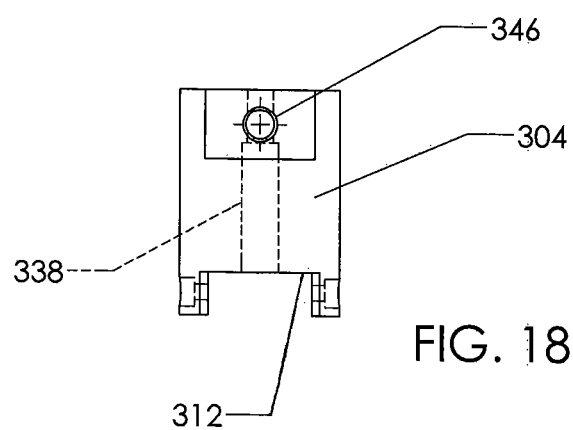
FIG. 18 is a side view of the wrench body of FIG. 16.
Figure 16:
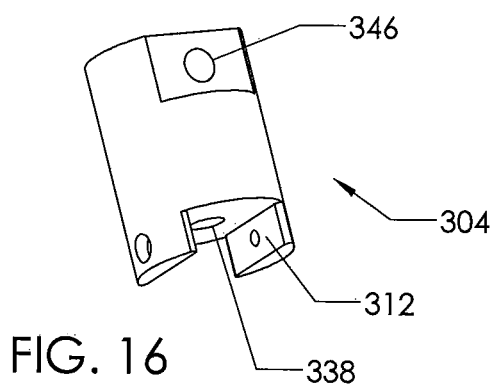
FIG. 16 is a perspective view of a wrench body of the installation tool of FIG. 10.
Figure 19:
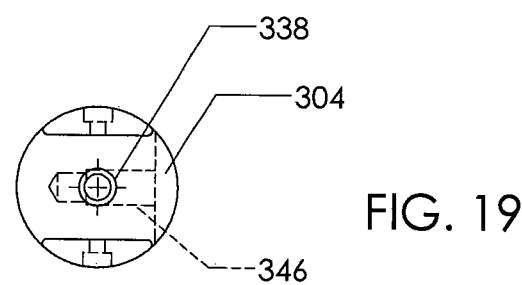
FIG. 19 is a bottom view of the wrench body of FIG. 16.

The installation tool 300 is illustrated in FIGS. 10 and 11. The installation tool 300 is illustrated with a deck button 212 and a rivet nut 246 in FIG. 10. As shown in FIG. 11, the tool 300 includes a wrench body 304 (FIGS. 16-19) and a wrench insert 308 (FIGS. 12-15). The wrench insert 308 is received into a recess 312 of the wrench body 304 and coupled to the wrench body 304 with a pair of fasteners 316 (e.g., screws). The wrench insert 308 has an interior surface 320 that engages the deck button 212 around a portion of its periphery. The interior surface 320 includes a projection 322 that generally fits within the groove 234 of the deck button 212. A wrench surface 324 of the interior surface 320 of the wrench insert 308 is configured to engage the flat sides 212B of the deck button 212 to hold the deck button 212 and the rivet nut 246 from rotating during driving of the screw 242.

Further, the tool 300 has a driver holder 330 with a first end 330A configured to receive an installation torque from an external power tool (e.g., pneumatic or electric drill/driver) and a second end 330B configured to engage a drive bit or driver 334. The driver 334 is configured to engage and drive the screw 242 through the deck button 212 and into the rivet nut 246 to set the rivet nut 246 and mount the deck button 212 all in one step. The driver holder 330 and the driver 334 extend through a central aperture 338 in the wrench body 304.

The tool 300 is not self-powered in the illustrated construction, but may include a slip-clutch to regulate or limit the maximum torque applied to the screw 242 regardless of the torque applied to the driver holder 330. The tool 300 includes a handle 340, which is gasped by a user's hand during use of the tool 300. The handle 340 is coupled to the wrench body 304 with a handle extension 344 having a first end that threads into an aperture 346 in the wrench body 304 and a second end that threads into the handle 340.

Figure 20A:
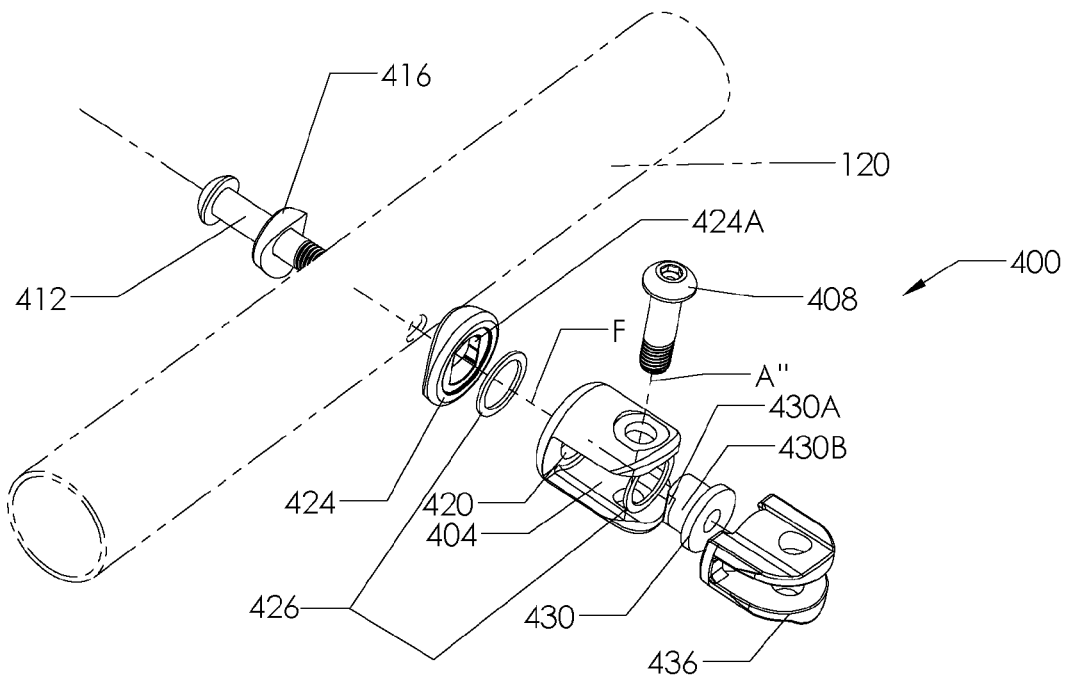
FIG. 20A is an exploded assembly view of a swivel fork assembly according to another embodiment of the invention.

FIG. 20A illustrates a swivel fork assembly 400 that is mountable to a tubular structure (e.g., the boat rail 120). The swivel fork assembly 400 of FIG. 20A is generally similar to the swivel fork assembly 200 described above. However, the swivel fork assembly 400 is not provided with two portions detachable by operation of a latch mechanism. Rather, the swivel fork assembly 400 of FIG. 20A is a "permanent-mount" swivel fork assembly for use where frequent assembly and disassembly are not intended.

The swivel fork assembly 400 includes a swivel fork body 404 that supports a pin 408. The pin 408 may be coupled with an eye end 128 as described above. The pin 408 defines an axis A" that is coincident with the axis A of the hole 132 in the eye end 128 when assembled together. A mounting screw 412 extends through an aperture in the rail 120 and bears against a saddle washer 416 at its head end. The mounting screw 412 extends through a central aperture 420 in the body 404. A swivel mount 424 and a slip washer 426 are positioned between the body 404 and the rail 120. The saddle washer 416 and the swivel mount 424 are contoured to match the outer surface of the rail 120 to securely position the swivel fork assembly 400 thereon.

Figure 21:
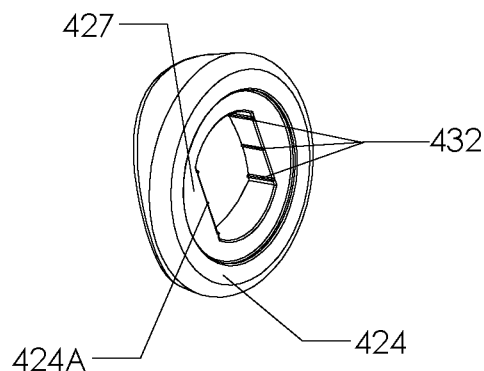
FIG. 21 is a perspective view of a swivel mount of the swivel fork assembly of FIG. 20A.

As shown in FIG. 21, the swivel mount 424 includes a washer seat 427. In the illustrated construction, the washer seat 427 is a cast recess having a shape similar to that of the slip washer 426 so that the slip washer 426 is at least partially received within the washer seat 427 when the swivel fork assembly 400 is assembled. The washer seat 427 functions to automatically position the slip washer 426 relative to the swivel mount 424 and to maintain the shape of the slip washer 426. The washer seat 427 allows the slip washer 426 to be constructed of a softer, less brittle, and more slippery material than would be allowable without the washer seat 427. Thus, binding between moving components is reduced, and longevity of the slip washer 426 is increased.

A flange nut 430 extends through the central aperture 420 in the body 404 and an end 430A of the flange nut 430 further extends into an opening 424A in the swivel mount 424. The opening 424A, like the end 430A of the flange nut 430 that is inserted therein, has at least one flat side so that the flange nut 430 is fixed against rotation relative to the swivel mount 424 and the rail 120. Ribs 432 (FIG. 21) formed on the interior of the opening 424A of the swivel mount 424 provide an interference fit with the flange nut 430 so that the components of the swivel fork assembly 400 are held axially together for ease of handling prior to being assembled with the mounting screw 412 (e.g., for shipping and handling between manufacturer and customer). A smooth exterior surface 430B of the flange nut 430 provides a guide surface on which the body 404 is rotatable about an axis F. A sleeve 436 lines the interior of the body 404 and acts as a liner or bushing for the eye end 128 (or another remote member), which may be positioned within the body 404 when assembled with the pin 408 to define a swiveling pin joint.

Similar to the swivel fork assembly 200 described above, the swivel fork assembly 400 of FIG. 20A provides an axis of rotation F in addition to the axis of rotation B (coaxial with the frame member 108) and in further addition to the shared axes of rotation A-A". Thus, the swivel fork assembly 400 provides a mounting assembly providing the necessary multi-planar articulation for the frame member 108 by providing for three independent axes of rotation at the joint, much like the detachable swivel fork assembly 200.

Figure 20B:
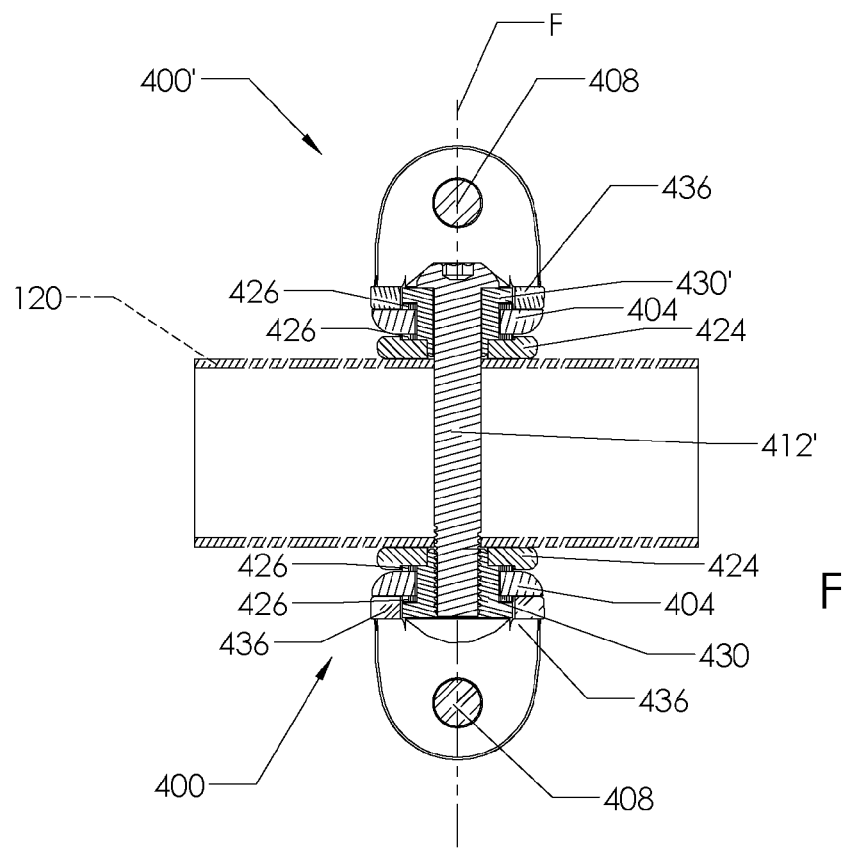
FIG. 20B is a cross-sectional view of two swivel fork assemblies, similar to that shown in FIG. 20A, assembled on the same tubular structure with a single fastener.

FIG. 20B illustrates an alternate construction similar to the swivel fork assembly 400 shown in FIG. 20A, which utilizes two swivel fork assemblies 400, 400'. In the construction of FIG. 20B, the two swivel fork assemblies 400, 400' are assembled on the same rail 120 with a single fastener 412'. As shown in FIG. 20B, the two swivel fork assemblies 400, 400' are oriented directly (i.e., 180 degrees) across from each other, sharing a common axis F. The mounting screw 412' is slightly longer than the mounting screw 412 shown in FIG. 20A to extend fully into the flange nut 430 positioned opposite the head of the mounting screw 412'. In the swivel fork assembly 400' positioned on the side of the rail 120 opposite the threaded end of the mounting screw 412', a flange bushing 430' (which does not thread onto the mounting screw 412') is used in place of a flange nut 430. In all other respects, the swivel fork assemblies 400, 400' are identical to each other and identical to the swivel fork assembly 400 illustrated in FIG. 20A and described in detail above. The construction of FIG. 20B enables two remote members to be swivel-mounted to the rail 120 at the same lengthwise location along the rail 120 while maximizing the use of common components and using minimal hardware.

The components described above and illustrated in the figures provide for multi-angular rotation of frame members 108 during operation of the bimini top 104 in a cost-effective manner with improved quality of construction and operation.

Figure 22:
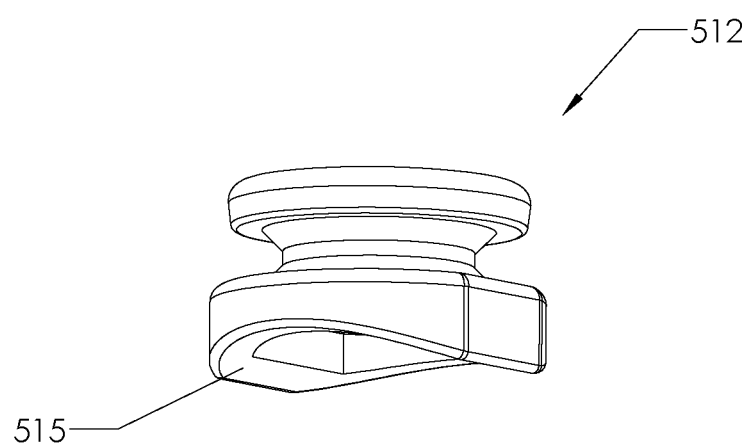
FIG. 22 is a perspective view of a deck button adapted for mounting on a curved surface.
Figure 23:
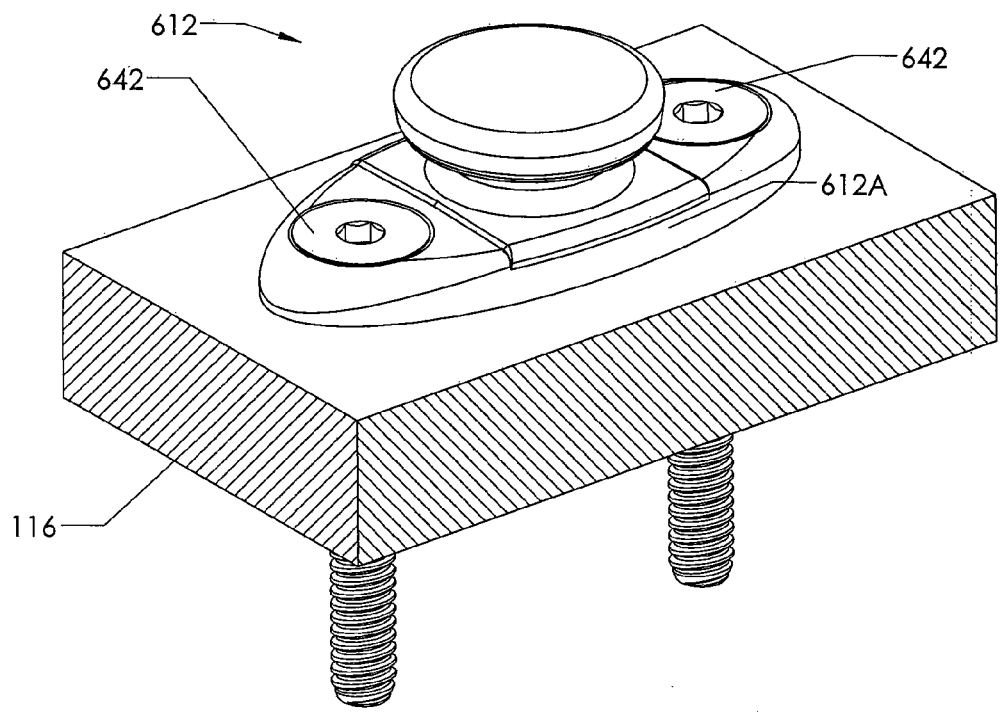
FIG. 23 is a perspective view of a deck button having a flange-style base.
Figure 24A:
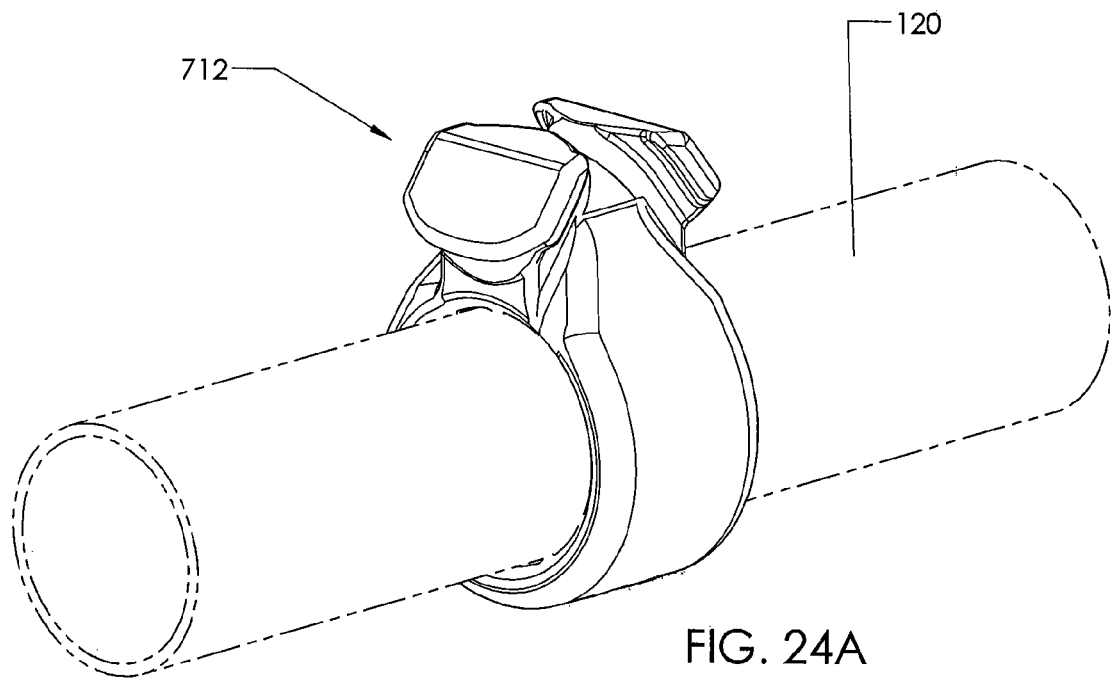
FIG. 24A is a perspective view of a two-headed deck button adapted for mounting around a tube.
Figure 24B:
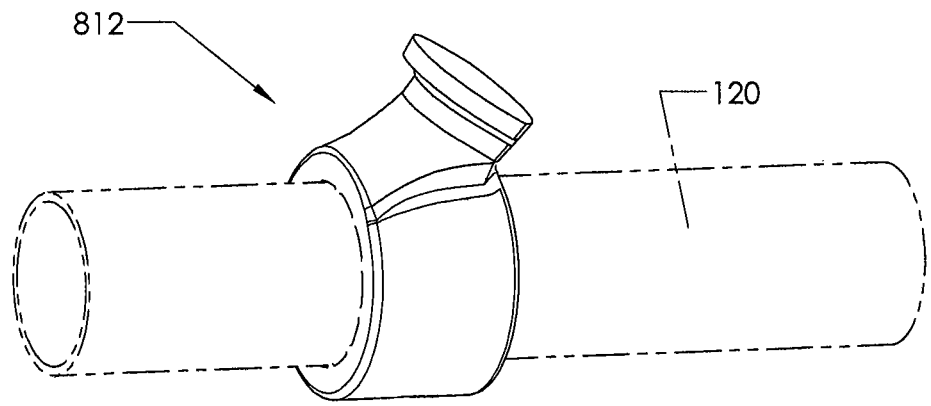
FIG. 24B is a perspective view of a deck button adapted for mounting around a tube.

FIGS. 22-24B illustrate four alternate deck buttons 512, 612, 712, and 812, each of which can be used as a first portion of a swivel fork assembly along with a body such as the body 204 shown in FIGS. 7-9. The deck button 512 of FIG. 22 is similar to the deck button 212 of FIGS. 7-9 except that the deck button 512 includes a coped base having a non-flat underside 515 that is configured to match the contour of a curved surface. The deck button 612 of FIG. 23 is similar to the deck button 212 of FIGS. 7-9 except that the bottom flange 612A of the deck button 612 extends laterally outward much greater than the bottom flange 212A of the deck button 212 of FIGS. 7-9 in two opposing directions. The extended bottom flange 612A includes apertures for two mounting screws 642 that are offset from the axis of the deck button 612, rather than the single, coaxial mounting screw 242 used for mounting the deck button 212 of FIGS. 7-9. Virtually any kind of nut may be used with the mounting screws 242. The deck buttons 712, 812 of FIGS. 24A and 24B are both ring-shaped to be placed onto and around a tubular mounting structure or substrate similar to the rail 120 of FIGS. 1, 20A, and 20B. The deck button 712 of FIG. 24A is a two-headed deck button that effectively provides two deck buttons integrated into one component.

Figure 25:
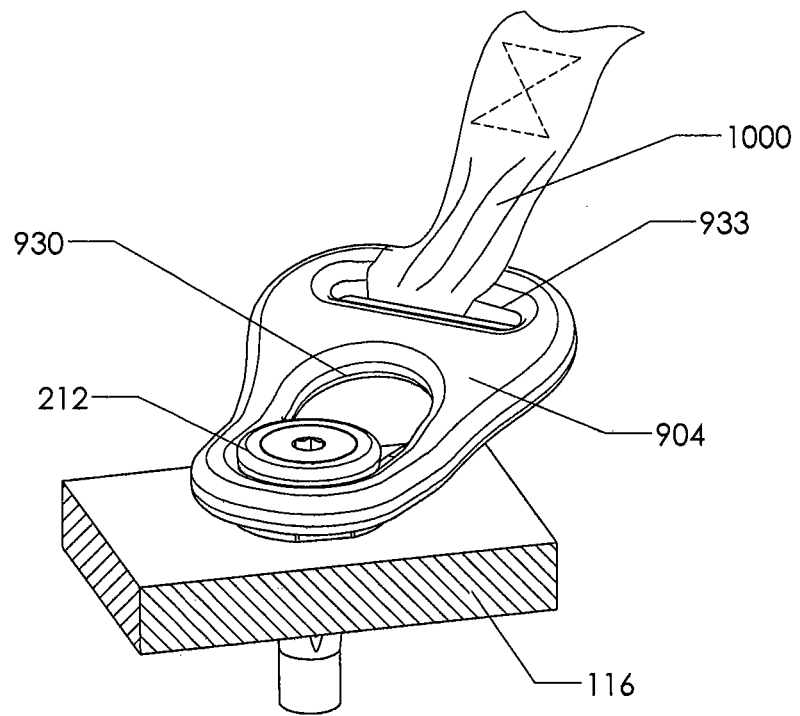
FIG. 25 is a perspective view of a deck button attachment configured to mount on a deck button and couple a rope or web strap thereto.
Figure 26:
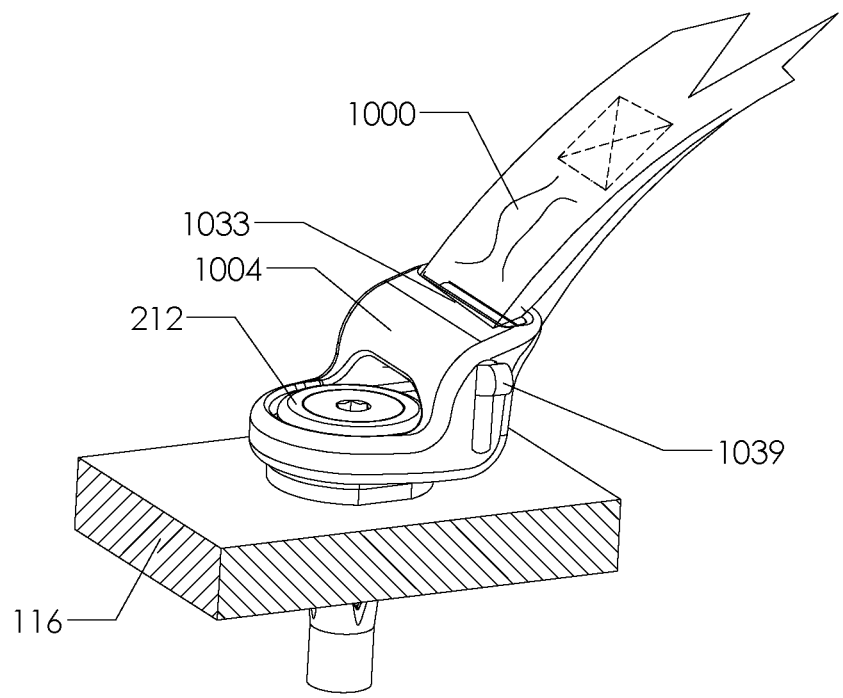
FIG. 26 is a perspective view of a quick-release deck button attachment configured to mount on a deck button and couple a rope or web strap thereto.
Figure 27:
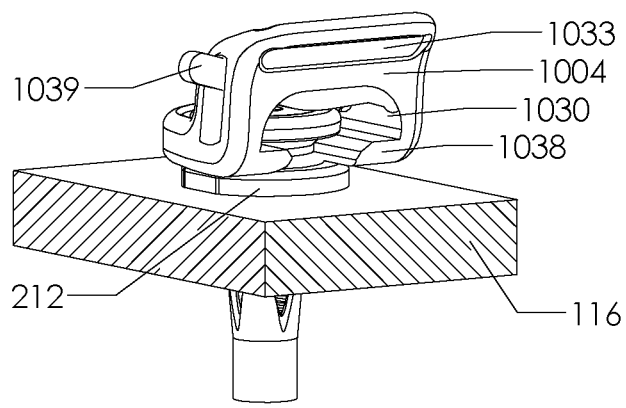
FIG. 27 is an alternate perspective view of the quick-release deck button attachment of FIG. 26.

FIGS. 25-27 illustrate bodies 904, 1004 that are attachable to any of the deck buttons disclosed herein and provide attachment for a rope or web strap. The bodies 904, 1004 are shown with the deck button 212 of FIGS. 7-9 for illustrative purposes. When attached, either of the bodies 904, 1004 is rotatable relative to the deck button 212 (e.g., about the third axis C of the deck button 212). The bodies 904, 1004 are coupled with and separated from the deck button 212 in a direction substantially perpendicular to the axis of rotation (similar to the body 204 described above). Also like the body 204 of FIGS. 7-9, the bodies 904, 1004 include respective openings or recesses 930, 1030 that allow the engagement with and release from the deck button 212. The bodies 904, 1004 include projections that engage the groove 234 in the deck button 212, similar to the projection 238 (FIGS. 8 and 9) on the body 204. The projection 1038 of the body 1004 is illustrated in FIG. 27. Each of the bodies 904, 1004 is provided with an aperture 933, 1033 configured to receive a rope or strap. In the illustrated embodiment, the apertures 933, 1033 are substantially elongated in one dimension to accommodate flat web straps 1000. Furthermore, the body 1004 of FIG. 26 includes a spring-loaded quick-release mechanism. The quick-release mechanism is operated with a latch member 1039 that is movable between a locked position and an unlocked position (shown in FIGS. 26 and 27). The latch member 1039 is biased downward to the locked position with a spring (not shown). Movement of the latch member 1039 to the unlocked position allows the body 1004 to be installed onto and removed from the deck button 212. The latch member 1039 prevents installation and removal of the body 1004 in the locked position.

In one construction, the invention provides a bimini top including a plurality of frame members configured to be coupled to a boat and further including a cover supported by the plurality of frame members to provide at least partial shelter for occupants of the boat. The plurality of frame members includes a first frame member and a second frame member that is non-parallel with the first frame member. Each of the first and second frame members includes a rotatably-mounted eye end positioned at one end thereof. The rotatably-mounted eye ends are rotatably coupled to the respective frame members with a bushing that is substantially fixed with respect to the frame member and allows the eye end to rotate relative to the frame member.

In another construction, the invention provides a quick-release swivel fork assembly for mounting a bimini top on a boat, the swivel fork assembly including a first portion and a body portion. The first portion is fixed to a portion of the boat. The body portion is releasably and rotatably coupled to the first portion. A quick-release locking mechanism includes a latch selectively operable to prevent and allow separation of the first and body portions of the swivel fork assembly. The body portion is rotatable about a first axis relative to the first portion, the body portion further defining a second axis of rotation, perpendicular to the first axis, a remote member (e.g., a portion of a bimini top) being rotatably coupled to the swivel fork assembly along the second axis.

In a further construction, the invention provides a stationary mounting structure to which a portion of a bimini top is coupled. The stationary mounting structure includes a deck button, a fastener, and a rivet nut. The deck button, the fastener, and the rivet nut are arranged along a common axis. The rivet nut is engaged with the deck button such that the rivet nut is fixed against rotation with respect to the deck button during installation of the deck button and after the deck button is installed.

In a further construction, the invention provides an installation tool for installing a stationary mount to which a portion of a bimini top is coupled. The installation tool includes a wrench body having a central aperture extending along an axis. The installation tool further includes a driver holder and a driver extending through the central aperture along the axis. The driver holder is configured to receive an installation torque and transmit at least a portion of the installation torque to the driver. The driver is configured to drive a fastener. The installation tool further includes a wrench insert received in a recess formed in the wrench body, the wrench insert being configured to engage the stationary mount and fix the same against rotation about the axis. In some constructions, the stationary mount is a deck button.

In a further construction, the invention provides a method of installing a stationary mount to which a portion of a bimini top is coupled. The method includes inserting a rivet nut into a mounting aperture. The stationary mount is aligned with the mounting aperture, and a flange of the rivet nut is received in a recess formed in stationary mount such that the stationary mount and the rivet nut are fixed against relative rotation. A fastener is passed through a central aperture in the stationary mount and threaded into the rivet nut to deform and anchor the rivet nut and also to mount the stationary mount in a single step as the fastener engages the rivet nut.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A quick-release swivel fork assembly for pivotably supporting a remote member, the quick-release swivel fork assembly comprising:
a first portion;
a body portion releasably coupled to the first portion, the body portion having a recess configured to rotatably receive the first portion such that the body portion is rotatable relative to the first portion about a first axis of rotation;
a groove and projection interface defined between surfaces of the first portion and the recess of the body portion that enables relative rotation between the first portion and the body portion while preventing separation along the first axis of rotation;
a pin supported by the body portion and defining a second axis of rotation for rotatably mounting the remote member to the swivel fork assembly; and
a latch member coupled to the body portion and movable relative to the body portion between first and second positions, the latch member being biased to the first position in which the latch member blocks separation of the body portion from the first portion in a direction substantially perpendicular to the first axis of rotation, the latch member being movable to the second position to enable separation of the body portion from the first portion in a direction substantially perpendicular to the first axis of rotation,
wherein the pin and the latch member are positioned at substantially opposite ends of the body portion along the first axis.

2. The quick-release swivel fork assembly of claim 1, wherein the recess is opened in a direction substantially perpendicular to the first axis of rotation.

3. The quick-release swivel fork assembly of claim 2, wherein the groove and projection interface includes a projecting rim formed on the body portion extending radially inward from the recess toward the first axis of rotation and into a circumferentially extending groove formed in the first portion.

4. The quick-release swivel fork assembly of claim 2, wherein the latch member at least partially closes the recess in the first position.

5. The quick-release swivel fork assembly of claim 1, wherein the groove and projection interface provides limitless relative rotation between the body portion and the first portion about the first axis of rotation.

6. The quick-release swivel fork assembly of claim 1, further comprising a biasing member at least partially enclosed within a cavity formed in the body portion, the biasing member urging the latch member to the first position.

7. The quick-release swivel fork assembly of claim 6, further comprising a retainer lining at least a portion of the cavity and at least a portion of the body portion adjacent the pin.

8. The quick-release swivel fork assembly of claim 1, wherein the body portion is forked along the first axis to open at a first end that receives the pin.

9. A quick-release swivel fork assembly for pivotably supporting a remote member, the quick-release swivel fork assembly comprising:
a first portion;
a body portion releasably coupled to the first portion, the body portion having a recess and the first portion being rotatably received within the recess such that the body portion is rotatable relative to the first portion about a first axis of rotation when coupled to the first portion and substantially immovable relative to the first portion along the first axis when coupled to the first portion, the recess being opened in a direction substantially perpendicular to the first axis of rotation;

a pin supported by the body portion and defining a second axis of rotation for rotatably mounting the remote member to the swivel fork assembly; and a latch member coupled to the body portion and movable relative to the body portion between first and second positions, the latch member being biased to the first position that inhibits removal of the body portion from the first portion in the direction of opening of the recess, the latch member being movable to the second position to enable removal of the body portion from the first portion in the direction of opening of the recess, wherein the pin and the latch member are positioned at substantially opposite ends of the body portion along the first axis.

10. The quick-release swivel fork assembly of claim 9, further comprising a groove and projection interface including a projecting rim extending radially inward from the recess toward the first axis of rotation and into a circumferentially extending groove formed in the first portion.

11. The quick-release swivel fork assembly of claim 10, wherein the groove and projection interface provides limitless relative rotation between the body portion and the first portion about the first axis of rotation.

12. The quick-release swivel fork assembly of claim 9, wherein the latch member at least partially closes the recess in the first position.

13. The quick-release swivel fork assembly of claim 9, further comprising a biasing member urging the latch member to the first position, the biasing member providing a biasing force in a direction substantially parallel to the first axis of rotation.

14. The quick-release swivel fork assembly of claim 13, further comprising a retainer at least partially enclosing the biasing member and lining the body portion adjacent the pin.

15. The quick-release swivel fork assembly of claim 9, wherein the body portion is forked along the first axis to open at a first end that receives the pin.

16. A quick-release swivel fork assembly for pivotably supporting a remote member, the quick-release swivel fork assembly comprising:

a first portion;

a body portion releasably coupled to the first portion, the body portion being rotatable relative to the first portion about a first axis of rotation when coupled to the first portion and substantially immovable relative to the first portion along the first axis when coupled to the first portion, the body portion configured to be coupled with and removed from the first portion with movement substantially perpendicular to the first axis of rotation;

a pin supported by the body portion and defining a second axis of rotation for rotatably mounting the remote member to the swivel fork assembly; and a latch member pivotally coupled to the body portion to pivot about an axis substantially perpendicular to the first axis of rotation such that the latch member is movable relative to the body portion between a first position that inhibits removal of the body portion from the first portion and a second position that enables removal of the body portion from the first portion, the latch member being movable from the first position to the second position against a bias force that is substantially parallel to the first axis of rotation, wherein the pin and the latch member are positioned at substantially opposite ends of the body portion along the first axis.

17. The quick-release swivel fork assembly of claim 16, wherein the body portion includes a recess opened in a direction substantially perpendicular to the first axis of rotation to selectively enable the first portion to be received into and removed from the recess.

18. The quick-release swivel fork assembly of claim 17, further comprising a groove and projection interface including a projecting rim extending radially inward from the recess toward the first axis of rotation and into a circumferentially extending groove formed in the first portion.

19. The quick-release swivel fork assembly of claim 18, wherein the groove and projection interface provides limitless relative rotation between the body portion and the first portion about the first axis of rotation.

20. The quick-release swivel fork assembly of claim 16, further comprising a biasing member at least partially enclosed within a cavity formed in the body portion and configured to exert the bias force.

21. The quick-release swivel fork assembly of claim 20, further comprising a retainer lining at least a portion of the cavity and at least a portion of the body portion adjacent the pin.

22. The quick-release swivel fork assembly of claim 16, wherein the body portion is forked along the first axis to open at a first end that receives the pin.

* * * * *